(12) United States Patent
Nazari et al.

(10) Patent No.: US 10,268,543 B2
(45) Date of Patent: Apr. 23, 2019

(54) ONLINE VOLUME REPAIR

(71) Applicant: HEWLETT PACKARD ENTERPRISE DEVELOPMENT LP, Houston, TX (US)

(72) Inventors: Siamak Nazari, Mountain View, CA (US); Jinyang Li, Fremont, CA (US); Srinivasa D Murthy, Cupertino, CA (US); Ying Fairweather, Bellevue, WA (US); Christopher Robert Sutton, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 188 days.

(21) Appl. No.: 15/418,523

(22) Filed: Jan. 27, 2017

(65) Prior Publication Data
US 2018/0217897 A1    Aug. 2, 2018

(51) Int. Cl.
G06F 11/07    (2006.01)
G06F 11/10    (2006.01)

(52) U.S. Cl.
CPC ...... G06F 11/1076 (2013.01); G06F 11/1004 (2013.01)

(58) Field of Classification Search
CPC .............................. G06F 11/10; G06F 11/1004
USPC ........................................................ 714/6.11
See application file for complete search history.

(56) References Cited

U.S. PATENT DOCUMENTS

| | | | |
|---|---|---|---|
| 5,699,539 A | 12/1997 | Garber et al. | |
| 5,754,756 A * | 5/1998 | Watanabe | G06F 11/1076 |
| | | | 711/114 |
| 6,298,422 B1 * | 10/2001 | Spilo | G06F 9/4843 |
| | | | 711/151 |
| 7,840,877 B2 | 11/2010 | Jacobson | |
| 8,190,850 B1 | 5/2012 | Davenport et al. | |
| 8,407,437 B1 * | 3/2013 | Cheng | G06F 11/108 |
| | | | 711/103 |
| 8,538,936 B2 | 9/2013 | Williams et al. | |
| 8,615,500 B1 | 12/2013 | Armangau et al. | |
| 8,694,703 B2 | 4/2014 | Hans et al. | |
| 8,832,142 B2 | 9/2014 | Marwah et al. | |
| 8,838,890 B2 | 9/2014 | Gupta et al. | |
| 8,892,846 B2 | 11/2014 | Pruthi et al. | |
| 9,026,740 B1 | 5/2015 | Shilane et al. | |

(Continued)

FOREIGN PATENT DOCUMENTS

EP    0976045 B1    4/2002
JP    2010218012 A  *  9/2010

OTHER PUBLICATIONS

Citrix, "Understanding Garbage Collection and Coalesce Process Troubleshooting," Jun. 2015, 5 pages, available at http://support.citrix.com/article/CTX201296.

(Continued)

*Primary Examiner* — Chae M Ko

(74) *Attorney, Agent, or Firm* — Hewlett Packard Enterprise Patent Department

(57) ABSTRACT

Examples include repair of a volume while the volume is online. In some examples, a request is received to access a compressed page, wherein the compressed page includes compressed data and compression metadata, an error is identified in the compression metadata or the compressed data, and based on the error and the request, repair of the error is handled while the volume is online.

19 Claims, 14 Drawing Sheets

(56) References Cited

U.S. PATENT DOCUMENTS

| | | | |
|---|---|---|---|
| 2002/0178333 A1 | 11/2002 | Wilson et al. | |
| 2005/0240414 A1* | 10/2005 | Tominaga | G10L 19/02 704/500 |
| 2006/0005069 A1* | 1/2006 | Gaertner | G11B 20/00007 714/5.11 |
| 2006/0212672 A1 | 9/2006 | Chandrasekaran et al. | |
| 2008/0307174 A1 | 12/2008 | Garst et al. | |
| 2009/0122870 A1* | 5/2009 | Sadowski | H04N 19/176 375/240.24 |
| 2011/0087840 A1 | 4/2011 | Glasco et al. | |
| 2011/0099321 A1 | 4/2011 | Haines et al. | |
| 2011/0307447 A1 | 12/2011 | Sabaa et al. | |
| 2012/0036239 A1* | 2/2012 | Donaghey | G06F 9/44563 709/221 |
| 2012/0284587 A1* | 11/2012 | Yu | G06F 3/0608 714/773 |
| 2013/0246690 A1* | 9/2013 | Haneda | G06F 12/0246 711/103 |
| 2013/0282676 A1 | 10/2013 | Wade et al. | |
| 2013/0326170 A1* | 12/2013 | Kilari | G06F 12/0246 711/161 |
| 2014/0075137 A1* | 3/2014 | Shin | G06F 12/08 711/159 |
| 2014/0372689 A1 | 12/2014 | Colgrove et al. | |
| 2015/0026538 A1* | 1/2015 | Sakai | G06F 11/1048 714/764 |
| 2016/0099076 A1* | 4/2016 | Oh | G11C 29/40 714/719 |
| 2016/0321135 A1* | 11/2016 | Berman | G06F 11/1044 |

OTHER PUBLICATIONS

International Search Report & Written Opinion received in PCT Application No. PCT/US2016/030082, dated Jan. 18, 2017, 12 pages.

Oracle Corporation, "Oracle Advanced Compression with Oracle Database 12c Release 2," (Research Paper), Oracle White Paper, Nov. 2016, 18 pages, http:/fwww.oracle.com/technetwork/database/options/comoression/advanced-comoression-wo-1 2c-1896128.pdf.

Shankar Iyer, "Compressed Pages Having Data and Compression," Application Serial No. PCT/US2016/030082, filed Apr. 29, 2016, 53 pps.

Wu, X. et al., "Selfie: Co-locating Metadata and Data to Enable Fast Virtual Block Devices," (Research Paper), May 26-28, 2015, 11 pages, available at http://www ece eng wayne edu/~sjiang/pubs/papers/wu15-selfie pdf.

Hayes, J., Excerpts from video: "Building Commercial Storage Systems from Consumer SSDs," Oct. 1, 2012, https://vimeo.com/50557873.

Hayes, J., "Building Commercial Storage Systems from Consumer SSDs," Oct. 1, 2012, (Presentation Slides), http://www.snia.org/sites/default/orig/SDC2012/presentations/Solid_State/JohnHayes_Enterprise_Storage_Systems.pdf.

\* cited by examiner

ONLINE VOLUME REPAIR

BACKGROUND

Storage solutions may be tasked with quickly and efficiently storing and retrieving large amounts of data with a finite amount of processing power, bandwidth, and memory. Some storage solutions may compress data to maximize storage capacity. Metadata may be used to facilitate discovery and retrieval of the compressed data. In some instances, errors may develop in the compressed data or the metadata.

BRIEF DESCRIPTION OF THE DRAWINGS

The following detailed description references the drawings, wherein.

DETAILED DESCRIPTION

Figure 1:
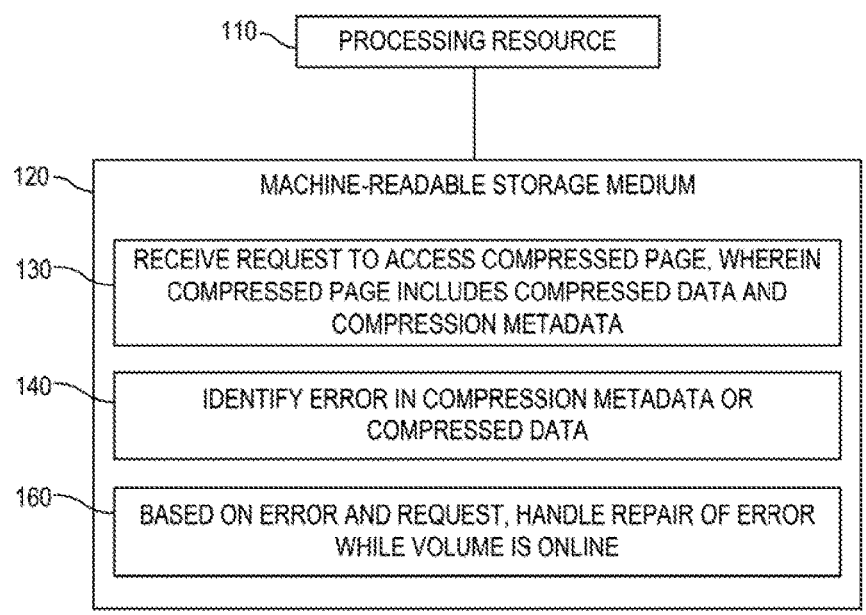
FIG. 1 is a block diagram of an example machine-readable storage medium including instructions to repair a volume while the volume is online based on an error and a received request.

Large amounts of data may need to be quickly and efficiently stored and retrieved using a finite amount of processing power, bandwidth, and memory. In some examples, memory management techniques may be used to generate a virtual memory system that may allow memory to appear as large, contiguous address spaces to processes or tasks. However, those addresses (i.e., virtual memory addresses) may or may not correspond to contiguous physical memory addresses.

In a virtual memory system, a translation table may be used to translate virtual memory addresses to corresponding physical memory addresses. In some such examples, each entry of the translation table may enable a virtual memory system to associate a virtual memory address with a physical memory address.

In addition, data compression techniques may be used to maximize storage capacity. In some examples, data may be compressed before being written to memory. Data compression may involve transmitting or storing data of a certain number of bits in a fewer number of bits via a compression algorithm. In some examples, data compression may involve encoding the data using fewer bits than the data's original representation. In other examples, data compression may involve reducing the size of the data by eliminating redundant or unnecessary bits.

Metadata may be generated that facilitates the discovery and retrieval of the compressed data. This metadata may be stored in a translation table or other page table. The metadata may also be stored with the compressed data in a same page. In some instances, in accessing the compressed data or the metadata, errors in the data or the metadata may be discovered.

In some systems, data and metadata errors may be repaired when the system is offline. In some such systems, storage volumes may be cascaded offline during repair to minimize downtime. In yet other systems, redundancy and failover policies may aid in recovering corrupted data or corrupted metadata. While these systems and repair policies may repair errors or allow for data recovery, they may not be able to make repairs to volumes while allowing input/output access to those volumes, may not be able to make online repairs to volumes in which metadata and compressed data are stored together in a same page, and may result in added latency, undue downtime, and increased costs.

Examples described herein may improve volume repair for storage solutions that use compressed pages having compression metadata and compressed data via online repair based on a request to the compressed page and an identified error. For instance, in some examples described herein, based on a read request and the identification of either a compression metadata error or a data error, a user may be alerted to initiate an online repair. In other examples described herein, based on a partial overwrite request and the identification of either a compression metadata error or a data error, online self-healing may be engaged in which the error is repaired online either without alerting the user or, in some instances, by alerting the user to initiate the online repair. In yet other examples described herein, based on a full page overwrite request and the identification of a compression metadata error, the error may be handled by performing the full page overwrite at another location.

In some examples described herein, a machine-readable storage medium may be encoded with instructions executable by a processing resource to repair a volume while the volume is online. The instructions may receive a request to access a compressed page, wherein the compressed page includes compressed data and compression metadata, identify an error in the compression metadata or the compressed data, and based on the error and the request, handle repair of the error while the volume is online.

In some such examples described herein, based on the error being a compression metadata error or a data error and the request being a read request, handling repair of the error while the volume is online further comprises instructions to alert a user to initiate an online repair, determine whether the user has initiated the online repair, and based on the determination that the user has initiated the online repair, identify each compressed page within the translation table. Handling the repair further comprises instructions to perform a partial data-less write to each identified compressed page to determine each compressed page that generates the compression metadata error or the data error and terminate each compressed page that generates the compression metadata error or the data error to repair the volume.

In other such examples described herein, based on the error being a compression metadata error or a data error and the request being a partial overwrite request, handling repair of the error while the volume is online further comprises instructions to determine whether another request to access the compressed page has been received, wherein the another request is a full page overwrite request, a second partial overwrite, or a read request. Handling the repair further comprises instructions to repair the error without alerting a user based on a determination that the full page overwrite request has been received and alert the user to initiate an online repair based on a determination that the second partial overwrite or the read request has been received.

In some such examples described herein, based on the error being a compression metadata error and the request being a full page overwrite request, handling repair of the error while the volume is online further comprises instructions to perform the full page overwrite at another location and update the translation table entry to point to the another location.

In some examples described herein, a device may include a processing resource and a machine-readable storage medium including instructions to receive a request to access a compressed page, wherein the compressed page includes compressed data and compression metadata, and wherein the request is a read request, a partial overwrite request, or a full page overwrite request. The machine-readable storage medium further includes instructions to identify an error in the compression metadata or the compressed data and, based on the error and the request, alert a user to initiate an online repair, engage in online self-healing, or perform the request at another location.

In some examples described herein, a method of repairing a volume while the volume is online via a process resource may involve receiving a request to access a compressed page, wherein the compressed page includes compressed data and compression metadata, determining whether the request is a read request, a partial overwrite request, or a full page overwrite request, and based on a determination that the request is a read request or a partial overwrite request, determining whether an error exists in the compression metadata or the compressed data of the compressed page. The method further includes determining whether an error exists in the compression metadata based on a determination that the request is the full page overwrite request. Based on the determination that an error exists, the method further includes handling repair of the error while the volume is online.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. In addition, in examples described herein, a determination, action, etc., that is said to be "based on" a given condition may be based on that condition alone or based on that condition and other condition(s).

Referring now to the drawings, FIG. 1 is a block diagram of an example machine-readable storage medium 120 that includes instructions to repair a volume while the volume is online. The instructions may be executable by a processing resource 110. A volume, as used herein, refers to a storage medium. In some examples, a volume may be any electronic, magnetic, optical, or other physical storage apparatus to contain or store information such as executable instructions, data, and the like. A volume may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. In some examples, a large volume may be divided or partitioned into multiple logical volumes.

As depicted in FIG. 1, machine-readable storage medium 120 comprises (e.g., is encoded with) instructions 130, 140, and 160 executable by processing resource 110 to implement functionalities described herein in relation to FIG. 1. In some examples, storage medium 120 may include additional instructions. In other examples, the functionalities described herein in relation to instructions 130, 140, 160, and any additional instructions described herein in relation to storage medium 120, may be implemented at least in part in electronic circuitry (e.g., via components comprising any combination of hardware and programming to implement the functionalities described herein).

As used herein, a machine-readable storage medium may be any electronic, magnetic, optical, or other physical storage apparatus to contain or store information such as executable instructions, data, and the like. For example, any machine-readable storage medium described herein may be any of RAM, volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a fieldprogrammable gate array (FPGA) to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described above in relation to instructions 130, 140, and 160. In other examples, the functionalities of any of the instructions of storage medium 120 may be implemented in the form of electronic circuitry, in the form of executable instructions encoded on a machine-readable storage medium, or a combination thereof. In the example of FIG. 1, storage medium 120 may be implemented by one machine-readable storage medium, or multiple machine-readable storage media.

In the example of FIG. 1, instructions 130 may receive a request to access a compressed page. A request to access, as used herein, may refer to a message or command that stores, retrieves, or modifies data within a compressed page. In the examples described herein, a page may refer to a specific quantity of data. For example, a page may be a sequence of N bytes, where N is a power of 2. In examples involving virtual memory, a page may be 4 KiloBytes (KB) to 64 KB or more. A compressed page, as used in examples herein, refers to a page that includes compressed data and compression metadata. Compressed data, as used herein, refers to data that has been compressed for storage at the compressed page. The data may be compressed using any suitable compression algorithm. As used herein, compression metadata may refer to data that provides information about the compressed data. In some examples, the compression metadata may act as a header for the compressed page and may not be compressed.

The compressed data within the compressed page may include several virtual pages of data. In one example, a compressed page may include up to eight virtual pages. In other examples, the compressed page may include even more virtual pages depending on the size of the page, the amount of compression achieved, available memory space, and other such relevant variables. The request to the compressed page may call for an action to be performed at the compressed page, such as a read or a write.

Figure 10:
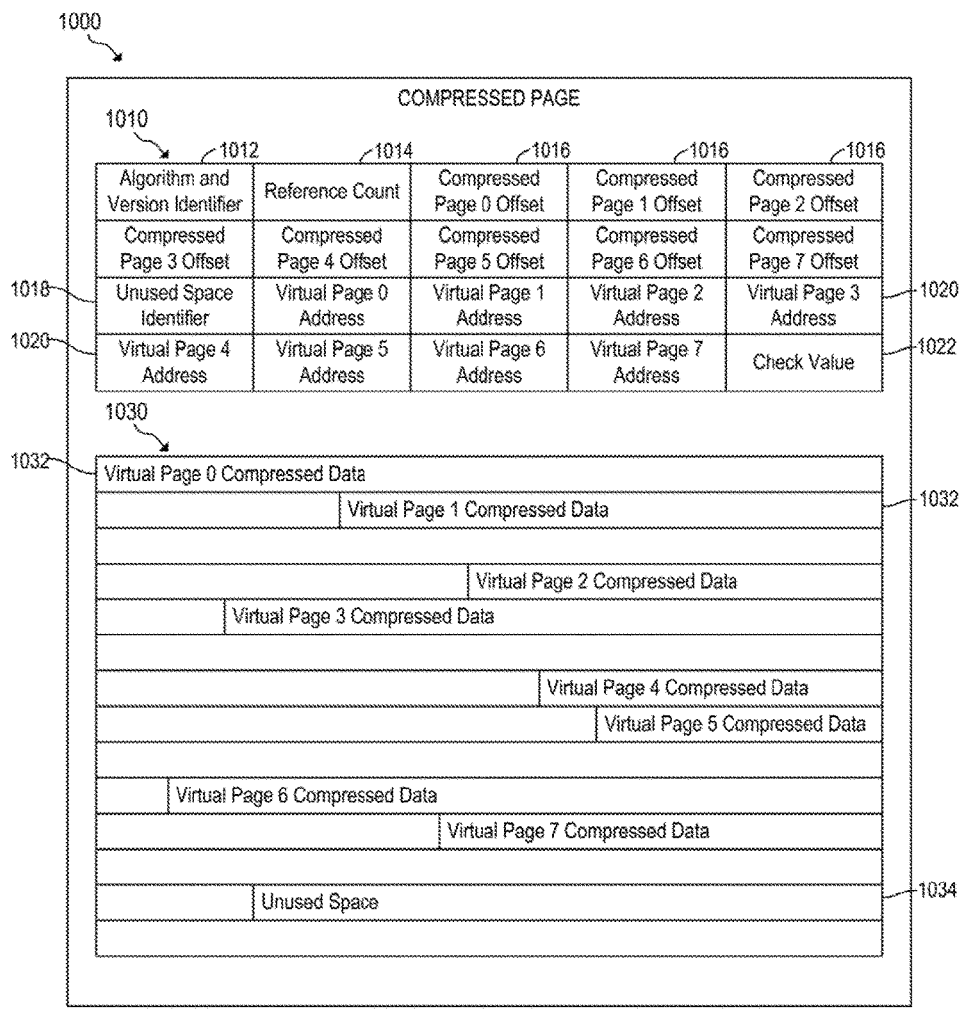
FIG. 10 is a block diagram of an example compressed page having compression metadata and compressed data.

Turning to FIG. 10, an example compressed page is described in more detail. FIG. 10 depicts a block diagram of an example compressed page 1000 including compression metadata 1010 and compressed data 1030. In the example of FIG. 10, the compressed page includes eight virtual pages of compressed data. Compression metadata 1010 includes algorithm and version identifier 1012, reference count 1014, compressed page offset 1016, unused space identifier 1018, virtual page address 1020, and check value 1022. Each of 1012, 1014, 1016, 1018, 1020, and 1022 may represent separate fields made up of one or more bits that provide information about the compressed page and the compressed data within the compressed page.

The algorithm and version identifier 1012 may indicate a compression algorithm and compression algorithm version used to compress the compressed data 1030. The reference count 1014 refer to the number of virtual pages within the compressed page. For instance, for a compressed page that includes two virtual pages, the reference count may include the value "2" or may otherwise indicate that the compressed page includes two virtual pages. In the example of FIG. 10, the reference count may have a value of "8" to indicate that compressed page 1000 includes eight virtual pages of data.

Each virtual page within compressed page 1000 may also have an associated compressed page offset 1016. The compressed page offset may refer to an offset that specifies where the data associated with each virtual page in a compressed page is located within that compressed page. As shown in FIG. 10, a compressed page that may hold up to eight virtual pages of compressed data may include eight compressed page offset fields. Accordingly, virtual page 0 would be associated with compressed page 0 offset, virtual page 1 would be associated with compressed page 1 offset, and so on. Each compressed page offset field may identify a byte location at which the compressed data begins within compressed page 1000.

Compression metadata 1010 further includes unused space identifier 1018 of FIG. 10, which identifies the amount of unused space 1034 within compressed page 1000. In some examples, unused space identifier 1018 may represent the amount of unused space 1034 as a byte value. The virtual page address 1020 may indicate the virtual page address of each virtual page within the compressed page. As shown, each of the eight virtual pages within compressed page 1000 may have an associated virtual page offset. Accordingly, virtual page 0 would be associated with virtual page 0 address, virtual page 1 would be associated with virtual page 1 address, and so on. Compression metadata 1010 also includes a check value 1022 to help detect errors in the compression metadata. In some examples, check value 1022 may be a checksum, a parity bit, a cyclic redundancy check value, or other suitable set of bits to detect errors that may have been introduced into compression metadata 1010.

As shown in FIG. 10, compressed data 1030 may include compressed data 1032 for up to eight virtual pages and may also, in some examples, include unused space 1034. Although not shown in FIG. 10, a compressed page may include fewer or more types of compression metadata 1010. Likewise, a compressed page may include fewer or more virtual pages of compressed data 1030.

Returning to FIG. 1, instructions 140 may identify an error in the compression metadata or the compressed data of the compressed page. An error in the compression metadata may involve nonsensical information, incorrect information as it relates to the compressed data, or corrupt information. Likewise, an error in the compressed data may involve nonsensical or corrupt data. Instructions 140 may identify the error at the time a requested operation is being performed on the compressed page.

Instructions 160 handle repair of the error while the volume is online based (at least in part) on the error and the request. Handling repair of an error while the volume is online, as used herein, involves removal of the error with or without recovery of associated data while input/output operations continue to and from the volume. In some examples, any lost data may be separately recovered via a snapshot, replica volume, or other suitable duplication or recovery scheme during or after repair of the error.

In some examples, instructions 130, 140, and 160 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 130, 140, and 160 may be part of an application, applications, or component(s) already installed on a device that includes processing resource 110. In such examples, storage medium 120 may include memory such as a hard drive, solid state drive, or the like. In some examples, functionalities described herein in relation to FIG. 1 may be provided in combination with functionalities described herein in relation to any of FIGS. 2-10.

Figure 2:
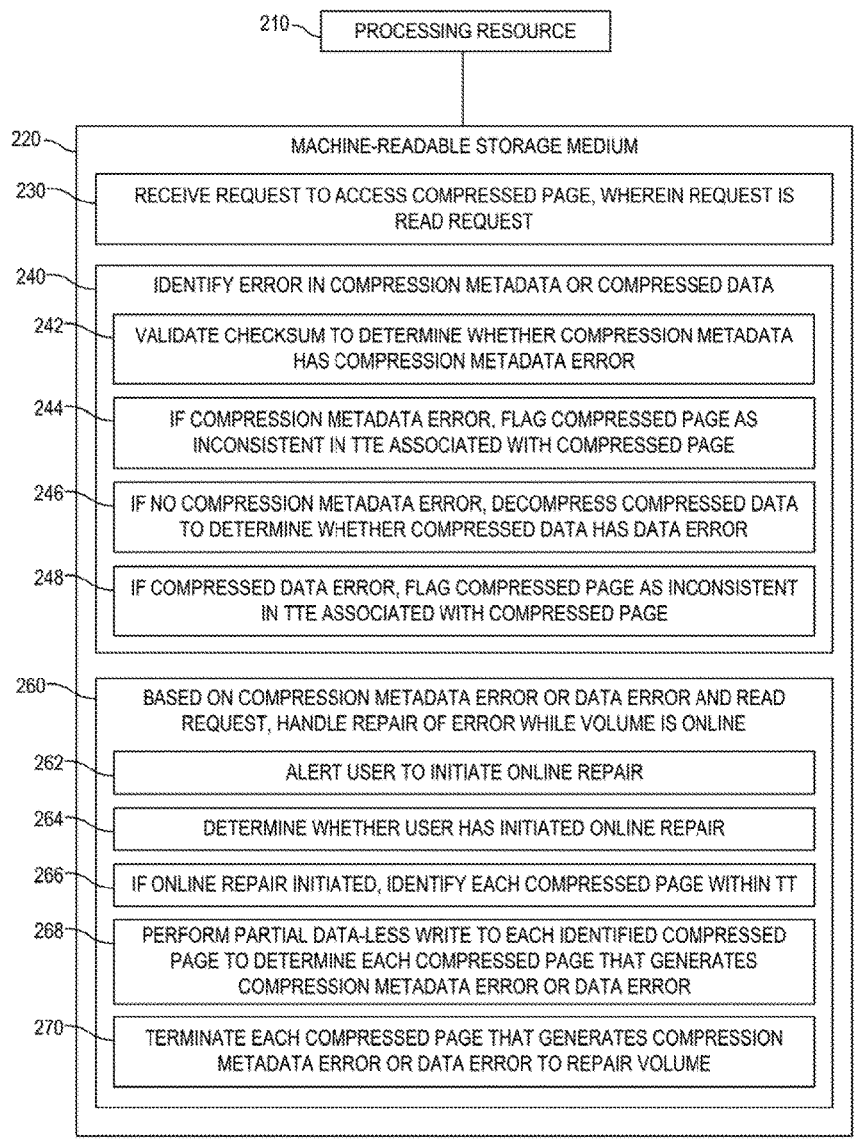
FIG. 2 is a block diagram of an example machine-readable storage medium including instructions to repair a volume while the volume is online based on the error being a compression metadata error or a data error and the received request being a read request.
Figure 3A:
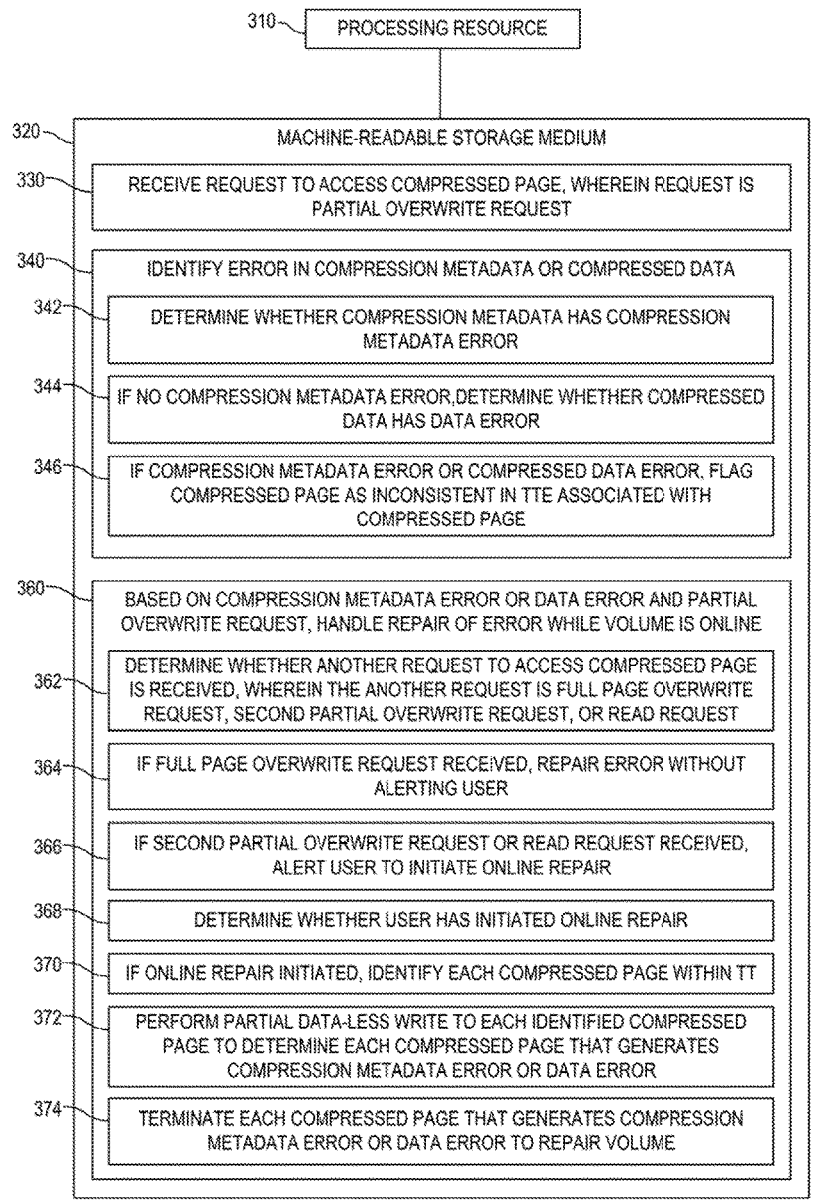
FIG. 3A is a block diagram of an example machine-readable storage medium including instructions to repair a volume while the volume is online based on the error being a compression metadata error or a data error and the received request being a partial overwrite request.
Figure 3B:
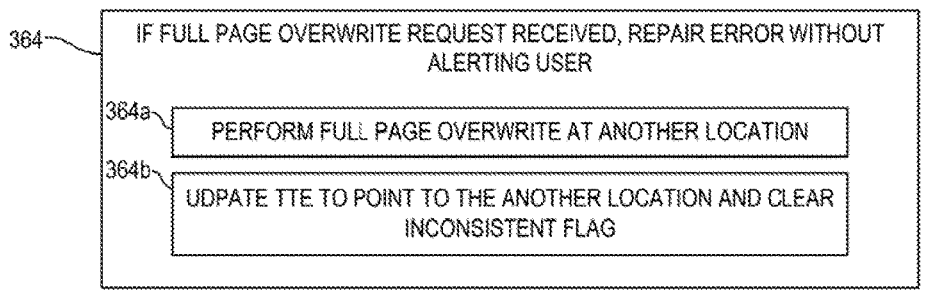
FIG. 3B is a block diagram of example instructions to repair the error without alerting the user.
Figure 4:
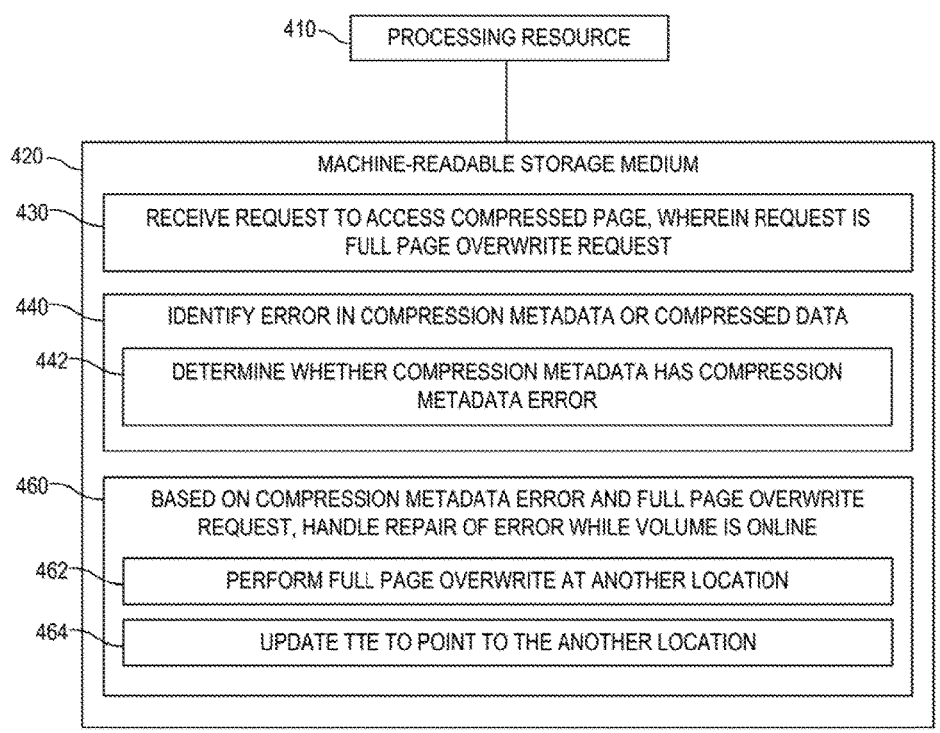
FIG. 4 is a block diagram of an example machine-readable storage medium including instructions to repair a volume while the volume is online based on an error being a compression metadata error and the received request being a full page overwrite request.

Further examples are described herein in relation to FIGS. 2-4. Each figure depicts how a particular type of error may be handled online when a specific request to access is received, namely a read request, a partial overwrite request, and a full page overwrite request. FIG. 2 is a block diagram of an example machine-readable storage medium 220 that includes instructions to repair a volume while the volume is online based (at least in part) on the error being a compression metadata error or a data error and the received request being a read request. In the example of FIG. 2, the identification of a compression metadata error or a data error when attempting to perform a read request may cause a user to be alerted to initiate an online repair. The example of FIG. 2 includes processing resource 210, and machine-readable storage medium 220 comprising instructions 230, 240, 242, 244, 246, 248, 260, 262, 264, 266, 268, and 270 executable by processing resource 210 to implement functionalities described herein in relation to FIG. 2.

Instructions 230 receive a request to access a compressed page that includes compressed data and compression metadata, as described above in relation to instructions 130 of FIG. 1. In the example of FIG. 2, the request is a read request. A read request, as used in the examples herein, may refer to a message or command to retrieve (i.e., read) data. In some examples, a read request may be received from a user (e.g., opening a file). In other examples, a read request may be received from a process or task as part of a larger transaction or operation.

As described above in relation to instructions 140 of FIG. 1, instructions 240 identify an error in the compression metadata or compressed data. Instructions 240 may further include instructions 242, 244, 246, and 248, as depicted in FIG. 2. Instructions 242 validate a checksum to determine whether the compression metadata has a compression metadata error. As used herein, a checksum refers to a value, a field, or set of bits that may be used to verify data integrity. In some examples, the checksum may be calculated over the compression metadata using a hash function and stored within a check value field of the compression metadata. The checksum may be recalculated and validated against the compression metadata to ensure data integrity during metadata storage and/or transmission.

Instructions 244 flag the compressed page as inconsistent in a translation table entry (TTE) associated with the compressed page based (at least in part) on a determination that the checksum indicates a compression metadata error. A translation table entry, as used in the examples herein, may refer to a row, a line, or other suitable portion of a translation table (TT) that aids in associating a virtual memory address with a physical memory address. In the example of a compressed page, the translation table may aid in associating a virtual memory address with a physical memory address by way of the compression metadata. In some examples, each page or compressed page within a volume may have an associated translation table entry in a translation table. The translation table entry associated with the compressed page may be flagged as inconsistent via a flag, a tag, a dedicated set of bits, a field, or other suitable mechanism that indicates the compressed page includes an error.

Instructions 246 decompress the compressed data to determine whether the compressed data has a data error, based (at least in part) on a determination that there is no compression metadata error. Decompression may be undertaken via any suitable decompression algorithm. In some examples, decompression may be unsuccessful, indicating that the compressed data has a data error. In other examples, a checksum, cyclic redundancy check, parity bit, or the like, may be used with the compressed data to confirm the data's integrity.

Based (at least in part) on a determination that the compressed data has a data error, instructions 248 flag the compressed page as inconsistent in the translation table entry associated with the compressed page. Flagging the translation table entry as inconsistent may be done via a flag, a tag, a dedicated set of bits, a field or other suitable mechanism that indicates the compressed page includes an error.

As described above in relation to instructions 160 of FIG. 1, instructions 260 handle repair of the error while the volume is online based (at least in part) on the error and the request. Instructions 260 may further include instructions 262, 264, 266, 268, and 270, as depicted in FIG. 2. In the example of FIG. 2, the error is the compression metadata error or the data error and the request is the read request.

Instructions 262 alert a user to initiate an online repair. The user may be alerted via any suitable communication, including, a visual message such as a pop-up error message, an audio message such as a beep, or any other messaging format or indication which communicates to the user that an online repair should be initiated. Instructions 264 determine whether the user has initiated the online repair. In some examples, instructions 264 may "listen" for whether the user has initiated the online repair by monitoring a particular address, channel, or line. In other examples, instructions 264 may examine any user actions to identify when the user has initiated the online repair.

Instructions 266 may walk through a translation table associated with the volume to identify each compressed page, based (at least in part) on a determination that the online repair has been initiated. In some examples, each translation table entry may be examined to identify entries associated with compressed pages from those entries associated with pages that are not compressed. In other examples, a translation table dedicated to compressed pages may be used. Instructions 268 perform a data-less write to each identified compressed page within the translation table to determine each compressed page that generates a compression metadata error or a data error. A data-less write, as used in the examples herein, may refer to an empty write operation that leaves the data within a compressed page unchanged. The data-less write is an operation that traverses a write path, but does not send data. It may initiate a read operation of the compressed page, but sends no data to the compressed page. Performance of the data-less write may generate a compression metadata error or a data error, as described above in relation to instructions 242 and 246.

Instructions 270 terminate each compressed page that generates a compression metadata error or a data error to repair the volume. Terminating the compressed page may involve removing the associated translation table entry from the translation table. In some examples, terminating the compressed page may generate an exception if a user, task, or process attempts to later access the page. In other examples, if the data in the compressed page is recoverable via a snapshot or other recovery mechanism, that data may be copied to a different compressed page at a new location and the translation table entry may be updated to point to the new location. Instructions 266, 268, and 270 operate on the volume while it remains online and is accessible to requests to access and storage and retrieval operations.

In some examples, instructions 230, 240, 242, 244, 246, 248, 260, 262, 264, 266, 268, and 270 may be part of an installation package that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 230, 240, 242, 244, 246, 248, 260, 262, 264, 266, 268, and 270 may be part of an application, applications, or component(s) already installed on a device that includes processing resource 210. In such examples, storage medium 220 may include memory such as a hard drive, solid state drive, or the like. In some examples, functionalities described herein in relation to FIG. 2 may be provided in combination with functionalities described herein in relation to any of FIGS. 1 and 3-10.

FIG. 3A is a block diagram of an example machine-readable storage medium 320 that includes instructions to repair a volume while the volume is online based (at least in part) on the error being a compression metadata error or a data error and the received request being a partial overwrite request. In the example of FIG. 3A, a partial overwrite request to a compressed page having a compression metadata error or a data error may delay error handling until another request to access the compressed page is received. Based on the another request, the error may be handled with or without a user-initiated online repair. The example of FIG. 3A includes processing resource 310, and machine-readable storage medium 320 comprising instructions 330, 340, 342, 344, 346, 360, 362, 364, 366, 368, 370, 372, and 374 executable by processing resource 310 to implement functionalities described herein in relation to FIG. 3A.

Instructions 330 receive a request to access a compressed page that includes compressed data and compression metadata, as described above in relation to instructions 130 of FIG. 1. In the example of FIG. 3A, the request is a partial overwrite request. A partial overwrite request, as used in the examples herein, may refer to a message or command to store write data in a compressed page in which a portion, but not all, of a virtual page within the compressed page is being overwritten. In some examples, the partial overwrite request may be received from a user (e.g., saving a file). In other examples, the partial overwrite request may be received from a process or task as part of a larger transaction or operation.

As described above in relation to instructions 140 of FIG. 1, instructions 340 identify an error in the compression metadata or compressed data. Instructions 340 may further include instructions 342, 344, and 346, as depicted in FIG. 3A. Instructions 342 determine whether compression metadata has a compression metadata error. In some examples, a checksum, check value, cyclic redundancy check, parity bit, or the like may be used to determine whether the compression metadata has an error.

Instructions 344 determine whether the compressed data has a data error, based (at least in part) on a determination that the compression metadata does not have a compression metadata error. In some examples, the compressed data may be decompressed to determine whether a data error exists. In other examples, a checksum, check value, cyclic redundancy check, parity bit, or the like may be used to determine whether the compressed data has an error.

As described above in relation to instructions 246 and 248, instructions 346 flag the compressed page as inconsistent in a translation table entry associated with the compressed page, based (at least in part) on a determination that the compression metadata has a compression metadata error or based (at least in part) on a determination that the compressed data has a data error. The translation table entry may be part of a translation table for the volume and is associated with the compressed page. The translation table entry may be flagged as inconsistent via a flag, a tag, a dedicated set of bits, a field, or other suitable mechanism that indicates the compressed page includes an error.

As described above in relation to instructions 160 of FIG. 1, instructions 360 handle repair of the error while the volume is online based (at least in part) on the error and the request. Instructions 360 may further include instructions 362, 364, 366, 368, 370, and 372, as depicted in FIG. 3A. In the example of FIG. 3A, the error is the compression metadata error or the data error and the request is the partial overwrite request.

Instructions 362 determine whether another request to access the compressed page has been received. The another request may be a full page overwrite request, a second partial overwrite request, or a read request. A full page overwrite request, as used in the examples herein, refers to a message or command to store write data in a compressed page in which a whole virtual page of the compressed page is being overwritten. In some examples, the full page overwrite request may be received from a user (e.g., saving a file). In other examples, the full page overwrite request may be received from a process or task as part of a larger transaction or operation.

Instructions 364 repair the compression metadata error or the data error without alerting the user, based (at least in part) on a determination that the another request has been received and that the another request is a full page overwrite request. FIG. 3B further describes repairing the error without alerting the user. As depicted in FIG. 3B, instructions 364 may include instructions 364a and 364b. In the example of FIG. 3B, instructions 364a perform the full page overwrite at another location. In such scenarios, when a partial overwrite request reveals a compression metadata or data error in the compressed page, but is followed by a full page overwrite to the compressed page, the error may be handled without alerting the user. The data from the partial overwrite may be discarded and the full page overwrite is performed at a different compressed page at another location. In some examples, the different compressed page is an unused compressed page that may be rewritten. Instructions 364b then update the translation table entry to point to the another location and the inconsistent flag is cleared. In some examples, clearing the inconsistent flag may involve removing a tag, toggling a bit, or otherwise indicating that the translation table entry does not have a compression metadata error or data error associated with it. Instructions 364, 364a, and 364b may operate on the volume while it remains online and is accessible to requests to access and storage and retrieval operations.

Returning to FIG. 3A, instructions 366 alert the user to initiate an online repair based (at least in part) on a determination that the another request has been received and that the another request is a second partial overwrite request or a read request. Because neither a second partial overwrite request nor a read request may be successfully performed at a compressed page with a compression metadata error or a data error, the user is alerted to initiate the online repair. As described above in relation to instructions 262, the user may be alerted via any suitable communication, including, a visual message such as a pop-up error message, an audio message such as a beep, or any other messaging format or indication which communicates to the user that an online repair should be initiated.

Instructions 368 determine whether the user has initiated the online repair, as described above in relation to instructions 264 of FIG. 2. Instructions 370 identify each compressed page within the translation table, based (at least in part) on a determination that the user has initiated the online repair, as described above in relation to instructions 266 of FIG. 2. Instructions 372 perform a partial data-less write to each identified compressed page within the translation table to determine each compressed page that generates a compression metadata error or a data error, as described above in relation to instructions 268 of FIG. 2. Instructions 374 terminate each compressed page that generates the compression metadata error or the data error to repair the volume, as described above in relation to instructions 270 of FIG. 2. Instructions 366, 368, 370, 372, and 374 may operate on the volume while it remains online and is accessible to requests to access and storage and retrieval operations.

In some examples, instructions 330, 340, 342, 344, 346, 360, 362, 364, 366, 368, 370, 372, and 374 may be part of an installation package that, when installed, may be executed by processing resource 310 to implement the functionalities described above. In such examples, storage medium 320 may be a portable medium, such as a CD, DVD, or flash drive, or a memory maintained by a server from which the installation package can be downloaded and installed. In other examples, instructions 330, 340, 342, 344, 346, 360, 362, 364, 366, 368, 370, 372, and 374 may be part of an application, applications, or component(s) already installed on a device that includes processing resource 310. In such examples, storage medium 220 may include memory such as a hard drive, solid state drive, or the like. In some examples, functionalities described herein in relation to FIGS. 3A and 3B may be provided in combination with functionalities described herein in relation to any of FIGS. 1-2 and 4-10.

FIG. 4 is a block diagram of an example machine-readable storage medium 420 that includes instructions to repair a volume while the volume is online based (at least in part) on the error being a compression metadata error and the received request being a full page overwrite request. In the example of FIG. 2, the identification of a compression metadata error when attempting to perform a full page overwrite request may cause the full page overwrite request to simply be written to another location. The example of FIG. 4 includes processing resource 410, and machine-readable storage medium 420 comprising instructions 430, 440, 442, 460, 462, and 464, executable by processing resource 410 to implement functionalities described herein in relation to FIG. 4.

As described above in relation to instructions 130 of FIG. 1, instructions 430 receive a request to access a compressed page that includes compressed data and compression metadata. in the example of FIG. 4, the request is a full overwrite request. A full page overwrite request, as used in the examples herein, refers to a message or command to store write data in a compressed page in which a whole virtual page of the compressed page is being overwritten. Instructions 440 identify an error in the compression metadata or compressed data, as described above in relation to instructions 140 of FIG. 1. Instructions 440 may further include instructions 442, as depicted in FIG. 4. Instructions 442 determine whether compression metadata has a compression metadata error. In some examples, a checksum, cyclic redundancy check, check value, parity bit, or the like may be used to determine whether the compression metadata has an error.

As described above in relation to instructions 160 of FIG. 1, instructions 460 handle repair of the error while the volume is online based (at least in part) on the error and the request. Instructions 460 may further include instructions 462 and 464, as depicted in FIG. 4. In the example of FIG. 4, the error is the compression metadata error and the request is the full page overwrite request.

Instructions 462 perform the full page overwrite at another location when a compression metadata error has been discovered at the compressed page. For instance, the full page overwrite may be performed at a different compressed page. In some examples, the different compressed page is an unused compressed page at the another location that may be rewritten. Instructions 464 update the translation table entry to point to the another location. In some examples, updating the translation table entry involves updating a physical memory address in the translation table entry such that an associated virtual memory address corresponds to an error-free physical memory address.

In some examples, instructions 430, 440, 442, 460, 462, and 464 may be part of an installation package that, when installed, may be executed by processing resource 410 to implement the functionalities described above. In such examples, storage medium 420 may be a portable medium, such as a CD, DVD, or flash drive, or a memory maintained by a server from which the installation package can be downloaded and installed. In other examples, instructions 430, 440, 442, 460, 462, and 464 may be part of an application, applications, or component(s) already installed on a device that includes processing resource 410. In such examples, storage medium 420 may include memory such as a hard drive, solid state drive, or the like. In some examples, functionalities described herein in relation to FIG. 4 may be provided in combination with functionalities described herein in relation to any of FIGS. 1-3 and 5-10.

Figure 5:
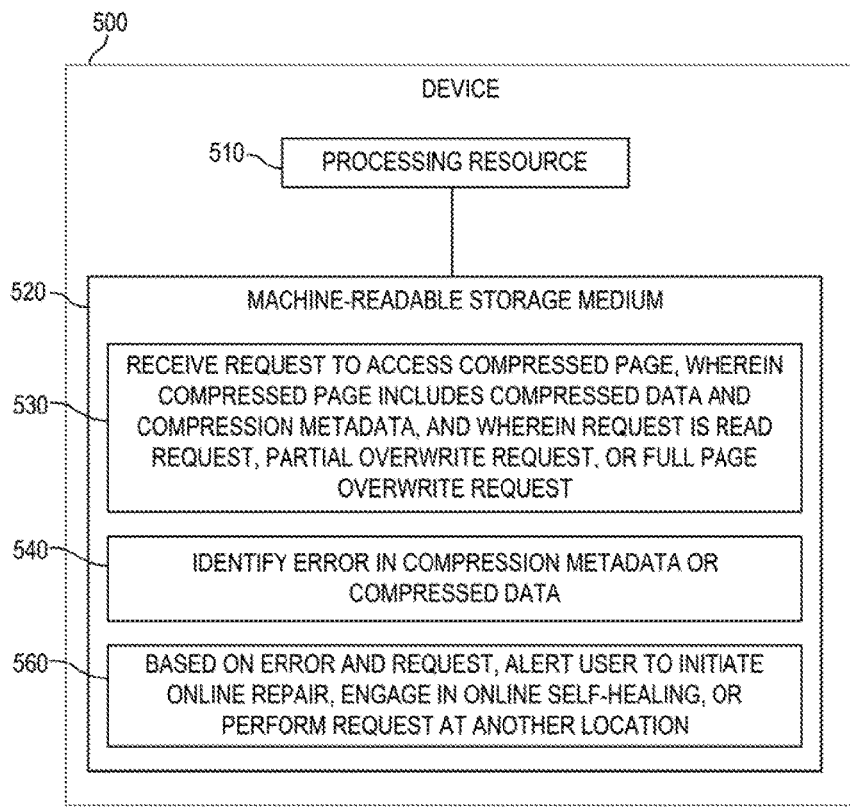
FIG. 5 is a block diagram of an example device having a processing resource and machine-readable storage medium with instructions to repair a volume while the volume is online based on an error and a received request.

Further examples are described herein in relation to FIGS. 5-8, which are block diagrams of example devices having a processing resource and a machine-readable storage medium that includes instructions to repair a volume while the volume is online. FIG. 5 depicts an example device 500 that includes a processing resource 510 and a machine-readable storage medium 520.

Device 500 may be any networking or computing device suitable for execution of the functionality described below. As used herein, a device may be a desktop computer, laptop (or notebook) computer, workstation, tablet computer, mobile phone, smart device, switch, router, server, blade enclosure, or any other processing device or equipment including a processing resource. In some examples, device 500 may be a controller node for a storage platform or may be located within a controller node for a storage platform.

As depicted in FIG. 5, device 500 may also include a machine-readable storage medium 520 comprising (e.g., encoded with) instructions 530, 540, and 560 executable by processing resource 510 to implement functionalities described herein in relation to FIG. 5. In some examples, storage medium 520 may include additional instructions. In other examples, the functionalities described herein in relation to instructions 530, 540, and 560, and any additional instructions described herein in relation to storage medium 520, may be implemented at least in part in electronic circuitry (e.g., via components comprising any combination of hardware and programming to implement the functionalities described herein).

As described above in relation to instructions 130 of FIG. 1, instructions 530 may receive a request to access a compressed page. The request may be received at device 500 and may be a read request, a partial overwrite request, or a full page overwrite request to the compressed page. The compressed page includes compressed data and compression metadata. Instructions 540 identify an error in the compression metadata or the compressed data of the compressed page, as described above in relation to instructions 140 of FIG. 1.

Based (at least in part) on the error and the request, instructions 560 alert a user to initiate an online repair, engage in online self-healing, or perform the request at another location. When the error is a compression metadata error or a data error and the request is a read request, the user may be alerted to initiate an online repair, as described in more detail in relation to FIG. 6. When the error is a compression metadata error or a data error and the request is a partial overwrite request, online self-healing may be engaged, as described in more detail in relation to FIG. 7. When the error is a compression metadata error and the request is a full page overwrite request, the request may be performed at another location, as described in more detail in relation to FIG. 8.

In some examples, instructions 530, 540, and 560 may be part of an installation package that, when installed, may be executed by processing resource 510 to implement the functionalities described above. In such examples, storage medium 520 may be a portable medium, such as a CD, DVD, or flash drive, or a memory maintained by a server from which the installation package can be downloaded and installed. In other examples, instructions 530, 540, and 560 may be part of an application, applications, or component(s) already installed on device 500 that includes processing resource 510. In such examples, storage medium 520 may include memory such as a hard drive, solid state drive, or the like. In some examples, functionalities described herein in relation to FIG. 5 may be provided in combination with functionalities described herein in relation to any of FIGS. 1-4 and 6-10.

Figure 6:
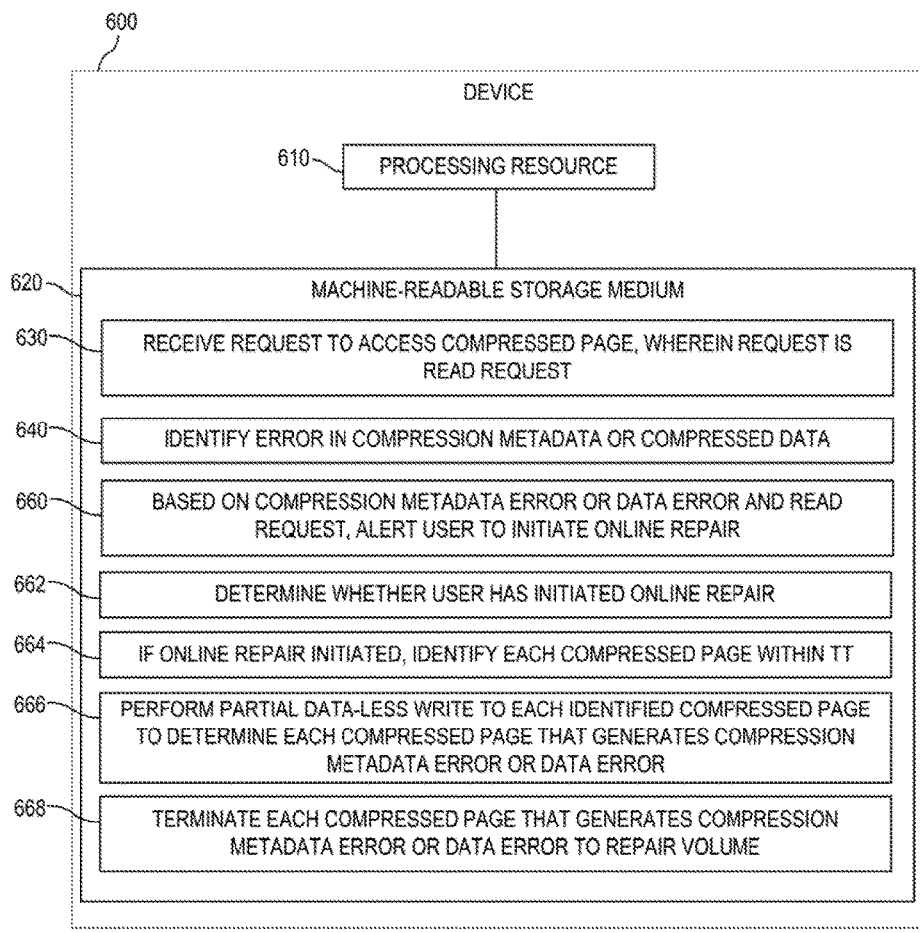
FIG. 6 is a block diagram of an example device having a processing resource and machine-readable storage medium with instructions to alert a user to initiate an online repair based on receiving a read request and identifying a compression metadata error or a data error.

FIG. 6 is a block diagram of an example device 600 that includes a processing resource 610. As depicted in FIG. 6, device 600 also includes a machine-readable storage medium 620 comprising (e.g., encoded with) instructions 630, 640, 660, 662, 664, 666, and 668 executable by processing resource 610 to implement functionalities described herein in relation to FIG. 6. In some examples, storage medium 620 may include additional instructions. In other examples, the functionalities described herein in relation to instructions 630, 640, 660, 662, 664, 666, 668, and any additional instructions described herein in relation to storage medium 620, may be implemented at least in part in electronic circuitry (e.g., via components comprising any combination of hardware and programming to implement the functionalities described herein). In some examples, device 600 may be a controller node for a storage platform or may be located within a controller node for a storage platform.

Instructions 630 receive a request to access a compressed page that includes compressed data and compression metadata, as described above in relation to instructions 230 of FIG. 2. In the example of FIG. 6, the request is a read request. Instructions 640 identify an error in the compression metadata or the compressed data of the compressed page, as described above in relation to instructions 242 and 246 of FIG. 2. In the example of FIG. 6, based (at least in part) on instructions 640 identifying either a compression metadata error or a data error and the request being a read request, instructions 660 alert a user to initiate an online repair. Instructions 660 may alert the user via any suitable communication, including, a visual message such as a pop-up error message, an audio message such as a beep, or any other messaging format or indication which communicates to the user that an online repair should be initiated, as described above in relation to instructions 262 of FIG. 2.

As described above in relation to instructions 264 of FIG. 2, instructions 662 determine whether the user has initiated the online repair. Instructions 664 identify each compressed page within a translation table based (at least in part) on a determination that the user has initiated the online repair, as described above in relation to instructions 266 of FIG. 2. In some examples, the translation table may include a translation table entry for each page within a volume. In other examples, the translation table may be dedicated to compressed pages and include translation table entries for each compressed page within a volume.

As described above in relation to instructions 268 of FIG. 2, instructions 666 perform a data-less write to each identified compressed page within the translation table to determine each compressed page that generates a compression metadata error or a data error. As described above in relation to instructions 270 of FIG. 2, instructions 268 terminate each compressed page that generates a compression metadata error or a data error to repair the volume. Instructions 660, 662, 664, 666, and 668 operate on the volume while it remains online and is accessible to requests to access and storage and retrieval operations.

In some examples, instructions 630, 640, 660, 662, 664, 666, and 668 may be part of an installation package that, when installed, may be executed by processing resource 610 to implement the functionalities described above. In such examples, storage medium 620 may be a portable medium, such as a CD, DVD, or flash drive, or a memory maintained by a server from which the installation package can be downloaded and installed. In other examples, instructions 630, 640, 660, 662, 664, 666, and 668 may be part of an application, applications, or component(s) already installed on device 600 that includes processing resource 610. In such examples, storage medium 620 may include memory such as a hard drive, solid state drive, or the like. In some examples, functionalities described herein in relation to FIG. 6 may be provided in combination with functionalities described herein in relation to any of FIGS. 1-5 and 7-10.

Figure 7:
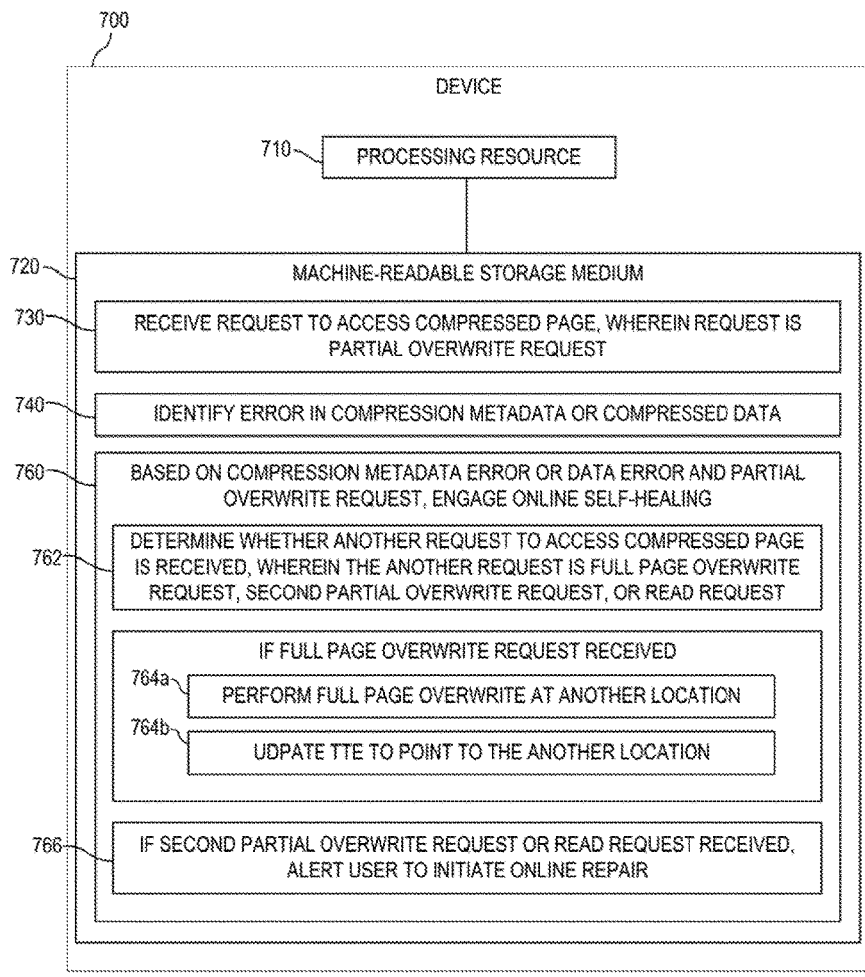
FIG. 7 is a block diagram of an example device having a processing resource and machine-readable storage medium with instructions to engage in online self-healing based on receiving a partial overwrite request and identifying a compression metadata error or a data error.

FIG. 7 is a block diagram of an example device 700 that includes a processing resource 710. As depicted in FIG. 7, device 700 also includes a machine-readable storage medium 720 comprising (e.g., encoded with) instructions 730, 740, 760, 762, 764a, 764b, and 766, executable by processing resource 710 to implement functionalities described herein in relation to FIG. 7. In some examples, storage medium 720 may include additional instructions. In other examples, the functionalities described herein in relation to instructions 730, 740, 760, 762, 764a, 764b, 766, and any additional instructions described herein in relation to storage medium 720, may be implemented at least in part in electronic circuitry (e.g., via components comprising any combination of hardware and programming to implement the functionalities described herein). In some examples, device 700 may be a controller node for a storage platform or may be located within a controller node for a storage platform.

Instructions 730 receive a request to access a compressed page that includes compressed data and compression metadata, as described above in relation to instructions 330 of FIG. 3A. In the example of FIG. 7, the request is a partial overwrite request. Instructions 740 identify an error in the compression metadata or the compressed data of the compressed page, as described above in relation to instructions 342 and 344 of FIG. 3A. In the example of FIG. 7, based (at least in part) on instructions 740 identifying either a compression metadata error or a data error and the request being a partial overwrite request, instructions 760 engage in online self-healing. As used in the examples herein, online self-healing may refer to an attempt to repair an error without first alerting a user while the volume remains online. In some examples, online self-healing may be successful and repair of the error may be handled without alerting a user. In other examples, online self-healing may involve an unsuccessful attempt to repair the error, resulting in a user being alerted. As depicted in FIG. 7, instructions 760 may further comprise instructions 762, 764a, 764b, and 766.

Instructions 762 determine whether another request to access the compressed page has been received at device 700, as described above in relation to instructions 362 of FIG. 3. The another request may be a full page overwrite request, a second partial overwrite request, or a read request. Based (at least in part) on a determination that the full page overwrite request has been received, instructions 764a perform the full page overwrite at another location, as described above in relation to instructions 364a of FIG. 3B. Instructions 764b then update a translation table entry associated with the compressed page to point to the another location, as described above in relation to instructions 364b of FIG. 3B. In some examples, each page of a volume may be associated with a translation table entry of a translation table. In other examples, a subset of pages of a volume are each associated with a translation table entry of a translation table. These translation table entries may aid in associating virtual memory addresses with a physical memory addresses. The execution of instructions 764a and 764b may repair the error without alerting the user.

Instructions 766 alert the user to initiate an online repair based (at least in part) on a determination that a second partial overwrite request or a read request has been received, as described above in relation to instructions 366 of FIG. 3A. In some examples, machine-readable storage medium 720 may further comprise instructions similar to instructions 368, 370, 372, and 374 of FIG. 3A to determine whether the user has initiated the online repair and complete the online repair of the volume.

In some examples, instructions 730, 740, 760, 762, 764a, 764b, and 766 may be part of an installation package that, when installed, may be executed by processing resource 610 to implement the functionalities described above. In such examples, storage medium 720 may be a portable medium, such as a CD, DVD, or flash drive, or a memory maintained by a server from which the installation package can be downloaded and installed. In other examples, instructions 730, 740, 760, 762, 764a, 764b, and 766 may be part of an application, applications, or component(s) already installed on device 700 that includes processing resource 710. In such examples, storage medium 720 may include memory such as a hard drive, solid state drive, or the like. In some examples, functionalities described herein in relation to FIG. 7 may be provided in combination with functionalities described herein in relation to any of FIGS. 1-6 and 8-10.

Figure 8:
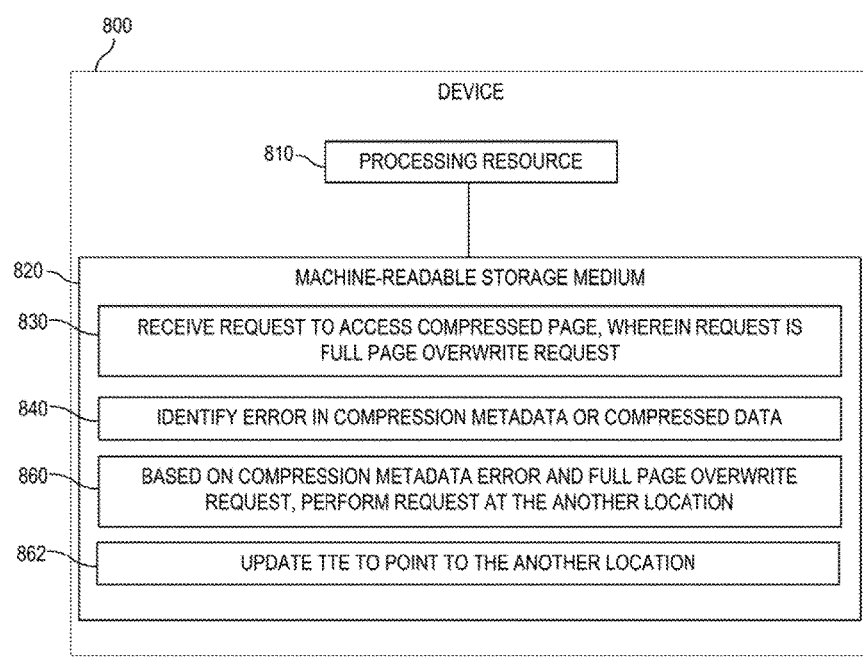
FIG. 8 is a block diagram of an example device having a processing resource and machine-readable storage medium with instructions to perform the request at another location based on receiving a full page overwrite request and identifying a compression metadata error.

FIG. 8 is a block diagram of an example device 800 that includes a processing resource 810. As depicted in FIG. 8, device 800 also includes a machine-readable storage medium 820 comprising (e.g., encoded with) instructions 830, 840, 860, and 862 executable by processing resource 810 to implement functionalities described herein in relation to FIG. 9. In some examples, storage medium 820 may include additional instructions. In other examples, the functionalities described herein in relation to instructions 830, 840, 860, 862, and any additional instructions described herein in relation to storage medium 820, may be implemented at least in part in electronic circuitry (e.g., via components comprising any combination of hardware and programming to implement the functionalities described herein). In some examples, device 800 may be a controller node for a storage platform or may be located within a controller node for a storage platform.

Instructions 830 receive a request to access a compressed page that includes compressed data and compression metadata, as described above in relation to instructions 430 of FIG. 4. In the example of FIG. 8, the request is a full page overwrite request. Instructions 840 identify an error in the compression metadata, as described above in relation to instructions 442 of FIG. 4. In the example of FIG. 8, based (at least in part) on instructions 840 identifying a compression metadata error and the request being a full page overwrite request, instructions 860 perform the request at another location, as described above in relation to instructions 462 of FIG. 4. In some examples, the full page overwrite request may be performed at a different compressed page at the another location. Instructions 862 update a translation table entry associated with the compressed page to point to the another location, as described above in relation to instructions 464 of FIG. 4. In some examples, each page of a volume may be associated with a translation table entry of a translation table. In other examples, a subset of pages of a volume are each associated with a translation table entry of a translation table. These translation table entries may aid in associating virtual memory addresses with a physical memory addresses. Updating the translation table entry may associate the compressed page's virtual memory address with an error-free physical memory address.

In some examples, instructions 830, 840, 860, and 862 may be part of an installation package that, when installed, may be executed by processing resource 610 to implement the functionalities described above. In such examples, storage medium 820 may be a portable medium, such as a CD, DVD, or flash drive, or a memory maintained by a server from which the installation package can be downloaded and installed. In other examples, instructions 830, 840, 860, and 862 may be part of an application, applications, or component(s) already installed on device 800 that includes processing resource 810. In such examples, storage medium 820 may include memory such as a hard drive, solid state drive, or the like. In some examples, functionalities described herein in relation to FIG. 8 may be provided in combination with functionalities described herein in relation to any of FIGS. 1-7 and 9-10.

Figure 9A:
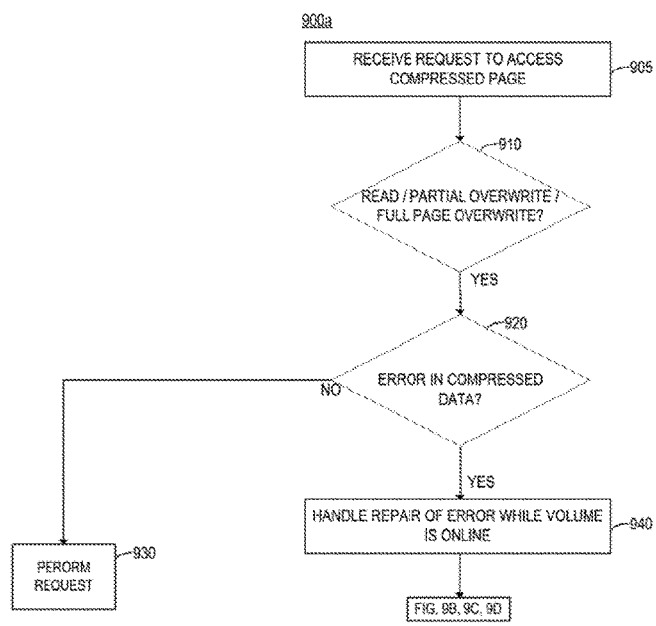
FIG. 9A is a flowchart of an example method for repairing a volume while the volume is online based on receiving a request to a compressed page and determining that an error exists.

FIG. 9A is a flowchart of an example method 900a for repairing a volume while online via a processing resource. Execution of method 900a may described below with reference to any of FIGS. 1-8, though other suitable systems for the execution of method 900a can also be utilized. In the example of FIG. 9A, portions of method 900a may be described as a method of device 100. Implementation of method 900a is not limited to such examples, however.

At 905 of method 900a, instructions 130 may receive a request to access a compressed page, wherein the compressed page includes compressed data and compression metadata. This receipt may be performed as described above in relation to instructions 130 of FIG. 1. At 910, method 900a may determine whether the request is a read request, a partial overwrite request, or a full page overwrite request. In some examples, this determination may be performed by examining a header, a message structure, or the contents of the request. In other examples, this determination may be performed by examining the origin of the request, or a line or channel by which it was received. Based (at least in part) on a determination that the received request is a read request, a partial overwrite request, or a full page overwrite request, method 900*a* may proceed to 920.

At 920, a determination may be made as to whether an error exists in the compressed page. In some examples, determining whether an error exists in the compressed page may involve determining whether a compression metadata error or a data error exists. This determination may be made as described above in relation to instructions 242 or 246 of FIG. 2 or instructions 342 and 344 of FIG. 3A. In some such examples, a compression metadata error may be determined via any suitable error checking mechanism, such as a checksum calculation, a cyclic redundancy check, use of a parity bit, and the like. In some examples, a data error may be determined my decompressed the compressed data and/or via a suitable error checking mechanism. Based (at least in part) on a determination that an error exists and based (at least in part) on the received request, method 900*a* may proceed to 940.

At 940, repair of the error may be handled while the volume is online, as described above in relation to instructions 160 of FIG. 1. Based (at least in part) on a determination that an error does not exist, method 900*a* may proceed to 930 and the request may be performed at the compressed page as a normal read operation or partial overwrite operation, as shown by the dashed lines.

Although the flowchart of FIG. 9A shows a specific order of performance of certain functionalities, method 900*a* may not be limited to that order. For example, functionalities shown in succession in the flowchart may be performed in a different order, may be executed concurrently or with partial concurrence, or a combination thereof. In some examples, functionalities described herein in relation to FIG. 9A may be provided in combination with functionalities described herein in relation to any of FIGS. 1-8 and 10.

Figure 9B:
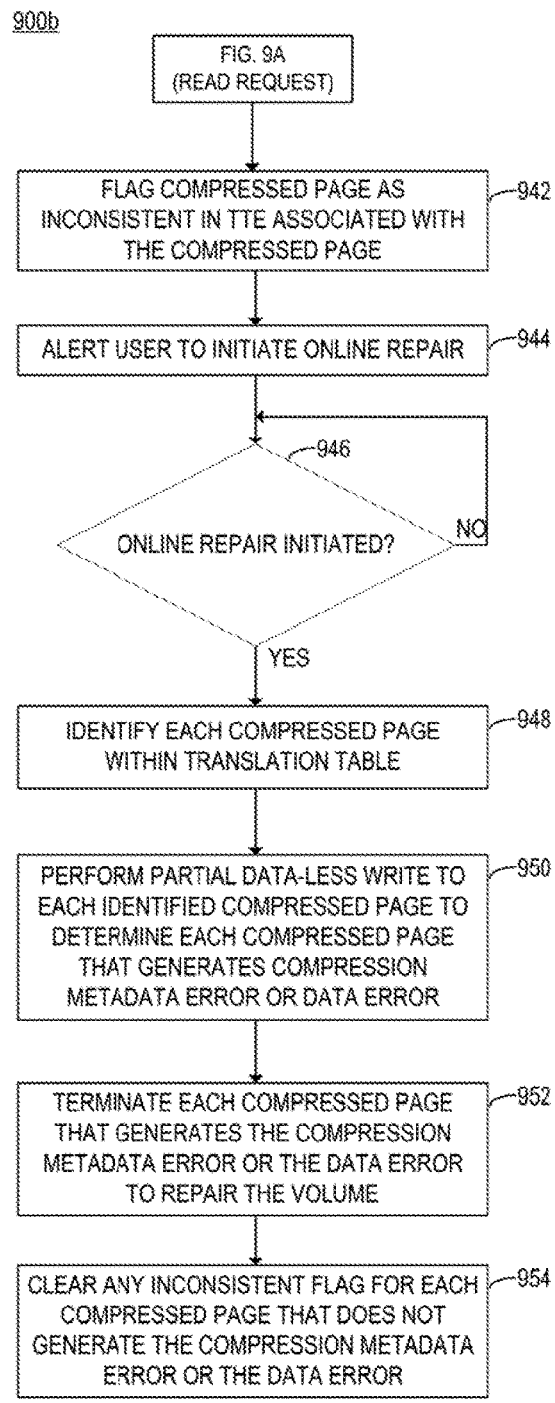
FIG. 9B is a flowchart of an example method for repairing a volume while the volume is online when the request is a read request.

FIG. 9B is a flowchart of an example method 900*b* of handling repair of an error while the volume is online based (at least in part) on the error being a compression metadata error or a data error and the request being a read request. Although execution of method 900*b* is described below with reference to FIG. 2, other suitable systems for the execution of method 900*b* can be utilized. Additionally, implementation of method 900*b* is not limited to such examples.

At 942 of method 900*b*, the compressed page may be flagged as inconsistent in the translation table entry associated with the compressed page. This flagging may be done as described above in relation to instructions 244 or 248 of FIG. 2. In some examples, the translation table entry may be flagged via a flag, a tag, a dedicated set of bits, or other suitable mechanism that indicates the compressed page includes an error. The translation table entry may be part of a translation table for the volume. At 944, a user may be alerted to initiate an online repair, as described above in relation to instructions 262 of FIG. 2. At 946, a determination may be made as to whether the online repair has been initiated, as described above in relation to instructions 264. Based (at least in part) on a determination that the online repair has not been initiated, method 900*b* may return to 946. Based (at least in part) on a determination that the online repair has been initiated, method 900*b* may proceed to 948.

At 948, each compressed page within the translation table may be identified, as described above in relation to instructions 266 of FIG. 2. At 950, a partial data-less write may be performed to each identified compressed page within the translation table to determine each compressed page that generates a compression metadata error or a data error, as described above in relation to instructions 268. At 952, each compressed page that generates the compression metadata error or the data error may be terminated, as described above in relation to instructions 270 of FIG. 2. At 954, each compressed page that does not generate the compression metadata error or the data error, but has been flagged as inconsistent, may have its inconsistent flag cleared. In some examples, clearing the inconsistent flag may involve removing a tag, toggling a bit, or removing any other indication associated with the translation table entry that marks the entry as inconsistent.

Although the flowchart of FIG. 9B shows a specific order of performance of certain functionalities, method 900*b* may not be limited to that order. For example, the functionalities shown in succession in the flowchart may be performed in a different order, may be executed concurrently or with partial concurrence, or a combination thereof. In some examples, functionalities described herein in relation to FIG. 9B may be provided in combination with functionalities described herein in relation to any of FIGS. 1-8 and 10.

Figure 9C:
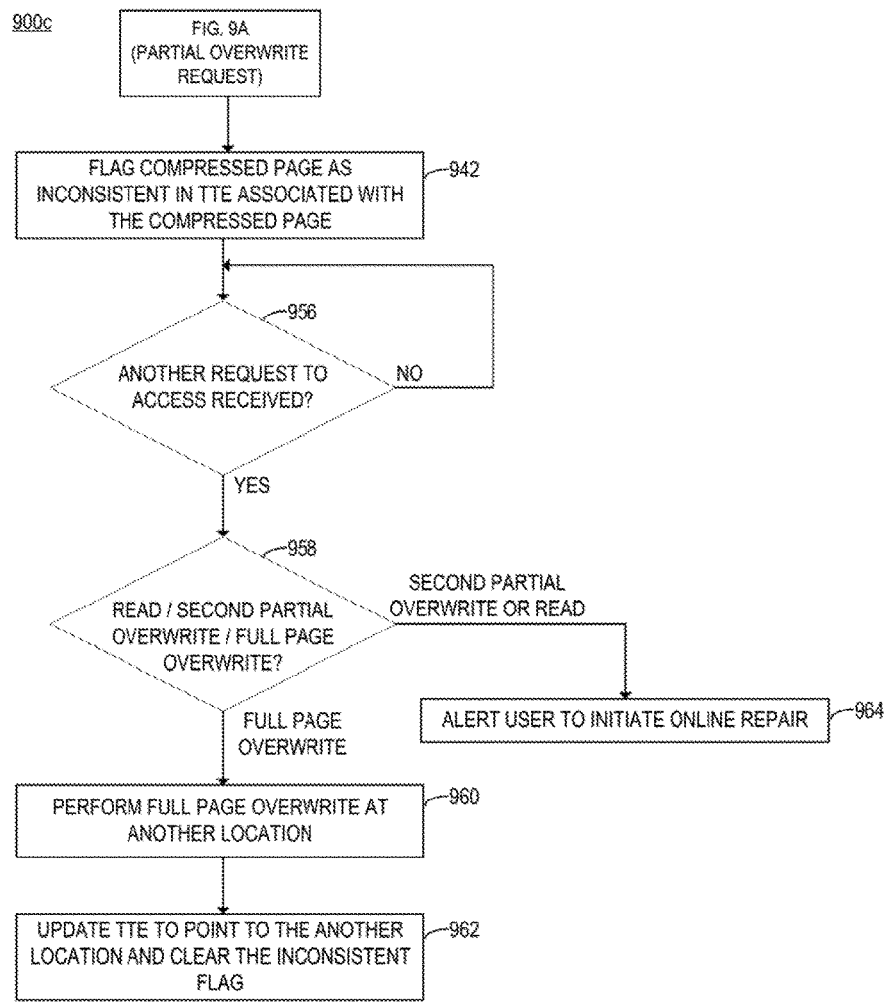
FIG. 9C is a flowchart of an example method for repairing a volume while the volume is online when the request is a partial overwrite request.

FIG. 9C is a flowchart of an example method 900*c* of handling repair of an error while the volume is online based (at least in part) on the error being a compression metadata error or a data error and the request being a partial overwrite request. Although execution of method 900*c* is described below with reference to FIGS. 3A and 3B, other suitable systems for the execution of method 900*c* can be utilized. Additionally, implementation of method 900*c* is not limited to such examples.

At 942 of method 900*b*, the compressed page may be flagged as inconsistent in the translation table entry associated with the compressed page. This flagging may be done as described above in relation to instructions 244 or 248 of FIG. 2. In addition, this flagging may be done as described above in relation to instructions 346 of FIG. 3. At 956, a determination may be made as to whether another request to access the compressed page has been received, as described above in relation to instructions 362 of FIG. 3. The another request may be a full page overwrite request, a second partial overwrite request, or a read request.

Based (at least in part) on a determination that the another request has not been received, method 900*c* may return to 956. Based (at least in part) on a determination that the another request has been received, method 900*c* may proceed to 958. At 958, a determination may be made as to whether the another request is a read request, a partial overwrite request, or a full page overwrite request. In some examples, this determination may be performed by examining a header, a message structure, or the contents of the another request. In other examples, this determination may be performed by examining the origin of the another request, or a line or channel by which it was received. Based (at least in part) on a determination that the received another request is a full page overwrite request, method 900*c* may proceed to 960.

At 960, a full page overwrite may be performed at another location, as described above in relation to instructions 364*a* of FIG. 3B. At 962, the translation table entry may be updated to point to the another location and the inconsistent flag may be cleared, as described above in relation to instructions 364*b* of FIG. 3B. Based (at least in part) on a determination that the received another request is a read request or a second partial overwrite request, method 900c may proceed to 964. At 964, a user may be alerted to initiate an online repair, as described above in relation to instructions 366 of FIG. 3. In some examples, method 900c may then proceed to 946 of method 900b at FIG. 9B.

Although the flowchart of FIG. 9C shows a specific order of performance of certain functionalities, method 900c may not be limited to that order. For example, the functionalities shown in succession in the flowchart may be performed in a different order, may be executed concurrently or with partial concurrence, or a combination thereof. In some examples, functionalities described herein in relation to FIG. 9C may be provided in combination with functionalities described herein in relation to any of FIGS. 1-8 and 10.

Figure 9D:
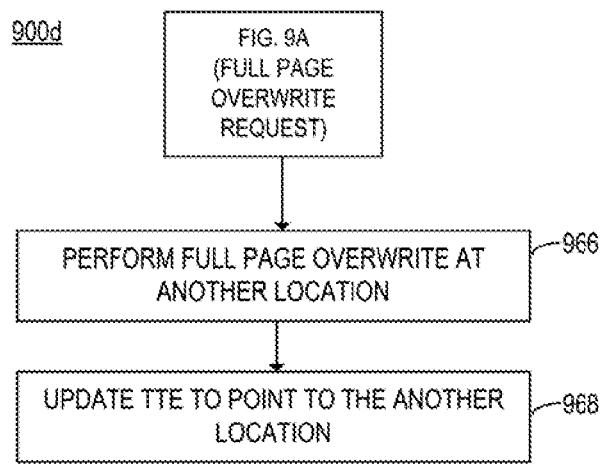
FIG. 9D is a flowchart of an example method for repairing a volume while the volume is online when the request is a full page overwrite request.

FIG. 9D is a flowchart of an example method 900d of handling repair of an error while the volume is online based (at least in part) on the error being a compression metadata error and the request being a full page overwrite request. Although execution of method 900d is described below with reference to FIG. 4, other suitable systems for the execution of method 900d can be utilized. Additionally, implementation of method 900d is not limited to such examples.

At 966, the full page overwrite may be performed at another location, as described above in relation to instructions 462 of FIG. 4. At 968, a translation table entry associated with the compressed page may be updated to point to the another location, as described above in relation to instructions 464 of FIG. 4. The translation table entry may be part of a translation table for the volume.

Although the flowchart of FIG. 9D shows a specific order of performance of certain functionalities, method 900d may not be limited to that order. For example, the functionalities shown in succession in the flowchart may be performed in a different order, may be executed concurrently or with partial concurrence, or a combination thereof. In some examples, functionalities described herein in relation to FIG. 9D may be provided in combination with functionalities described herein in relation to any of FIGS. 1-8 and 10.

What is claimed is:

1. A machine-readable storage medium comprising instructions executable by a processing resource to:
   receive a request to access a compressed page of a volume, wherein the compressed page includes compressed data and compression metadata;
   identify an error in the compression metadata or the compressed data;
   based on the identification of an error in the compression metadata or the compressed data when the request is a read request or a partial overwrite request, flag the compressed page as inconsistent in a translation table entry associated with the compressed page, wherein the translation table entry is part of a translation table for the volume; and
   based on the identified error and the request, handle repair of the error while the volume is online.

2. The machine-readable storage medium of claim 1, wherein the instructions to identify the error comprise instructions executable by the processing resource to:
   validate a checksum to determine whether the compression metadata has a compression metadata error; and
   based on a determination that the compression metadata does not have a compression metadata error, decompress the compressed data of the compressed page to determine whether the compressed data has a data error.

3. The machine-readable storage medium of claim 2, wherein the instructions to handle repair of the error while the volume is online comprise instructions executable by the processing resource to:
   based on the error being a compression metadata error or a data error and the request being a read request:
   alert a user to initiate an online repair;
   determine whether the user has initiated the online repair;
   based on the determination that the user has initiated the online repair, identify each compressed page within the translation table;
   perform a partial data-less write to each identified compressed page to determine each compressed page that generates a compression metadata error or a data error; and
   terminate each compressed page that generates a compression metadata error or a data error to repair the volume.

4. The machine-readable storage medium of claim 1, wherein the instructions to handle repair of the error while the volume is online comprise instructions executable by the processing resource to:
   when the request is a full page overwrite request and the error is a compression metadata error:
   perform the full page overwrite at a given location other than where the compressed page is stored; and
   update the translation table entry associated with the compressed page to point to the given location.

5. The machine-readable storage medium of claim 1, wherein the instructions to handle repair of the error while the volume is online comprise instructions executable by the processing resource to:
   based on the error being a compression metadata error or a data error, and the request being a partial overwrite request:
   determine whether another request to access the compressed page has been received; and
   based on the another request being another partial overwrite request or a read request, alert the user to initiate an online repair.

6. The machine-readable storage medium of claim 1, wherein the volume is a logical volume.

7. The machine-readable storage medium of claim 5, wherein the instructions to handle repair of the error while the volume is online comprise instructions executable by the processing resource to:
   determine whether the user has initiated the online repair;
   based on a determination that the user has initiated the online repair, identify each compressed page within the translation table;
   perform a partial data-less write to each identified compressed page to determine each compressed page that generates a compression metadata error or a data error; and
   terminate each compressed page that generates a compression metadata error or a data error to repair the volume.

8. The machine-readable storage medium of claim 5, wherein the instructions to handle the error while the volume is online comprise instructions executable by the processing resource to:
   based on the another request being a full page overwrite request:
   perform the full page overwrite at a given location other than where the compressed page is stored without alerting the user, wherein the error is a compression metadata error; and
update the translation table entry associated with the compressed page to point to the another location.

9. The machine-readable storage medium of claim 1, wherein the compressed page includes up to eight virtual pages of data and the compression metadata includes a reference count, a compressed page offset for each virtual page of data, a virtual page address for each virtual page of data, and a check value.

10. A device comprising:
a processing resource; and
a machine-readable storage medium encoded with instructions executable by the processing resource to:
receive a request to access a compressed page of a volume,
wherein the compressed page includes compressed data and compression metadata, and
wherein the request is a read request, a partial overwrite request, or a full page overwrite request;
identify an error in the compression metadata or the compressed data; and
based on identification of an error in the compression metadata when the request is a full page overwrite request, perform the full page overwrite at a given location other than where the compressed page is stored and update a translation table entry associated with the compressed page to point to the given location, wherein the translation table entry is part of a translation table for the volume; and
based on and the request being a partial overwrite request, flag the compressed page as inconsistent in the translation table entry, wherein the translation table entry is part of a translation table for the volume.

11. The device of claim 10, wherein the instructions are executable by the processing resource to, based on the error being a compression metadata error or a data error and the request being a read request, alert a user to initiate an online repair.

12. The device of claim 11, wherein the instructions are executable by the processing resource to:
determine whether the user has initiated the online repair;
based on the determination that the user has initiated the online repair, identify each compressed page within the translation table;
perform a partial data-less write to each identified compressed page to determine each compressed page that generates a compression metadata error or a data error; and
terminate each compressed page that generates a compression metadata error or a data error to repair the volume.

13. The device of claim 10, wherein the volume is a logical volume.

14. The device of claim 10, wherein the instructions are executable by the processing resource to:
when the request is a partial overwrite request:
determine whether another request to access the compressed page has been received;
based on the another request being a full page overwrite request;
perform the full page overwrite at a given location other than where the compressed page is stored without alerting the user, wherein the error is a compression metadata error, and update the translation table entry associated with the compressed page to point to the given location; and
based on the another request being another partial overwrite request or a read request, alert the user to initiate the online repair.

15. The device of claim 10, wherein the instructions are executable by the processing resource to:
based on the error being a compression metadata error and the request being a full page overwrite request:
perform the full page overwrite at a given location other than where the compressed page is stored; and
update the translation table entry associated with the compressed page to point to the given location.

16. A method of a processing resource, the method comprising:
receiving a request to access a compressed page of a volume, wherein the compressed page includes compressed data and compression metadata;
determining whether the request is a read request, a partial overwrite request, or a full page overwrite request;
determining whether an error exists in the compressed page;
based on a determination that an error exists in the compressed page and based on the request, handling repair of the error while the volume is online,
wherein, when the request is a full page overwrite request and the error in the compressed page is a compression metadata error, the handling repair of the error comprises:
performing the full page overwrite at a given location other than where the compressed page is stored; and
updating a translation table entry associated with the compressed page to point to the given location, wherein the translation table entry is part of a translation table for the volume.

17. The method of claim 16, wherein, when the request is a read request, the handling repair of the error while the volume is online comprises:
flagging the compressed page as inconsistent in the translation table entry associated with the compressed page;
alerting a user to initiate an online repair;
determining whether the user has initiated the online repair;
based on a determination that the user has initiated the online repair, identifying each compressed page within the translation table;
performing a partial data-less write to each identified compressed page to determine each compressed page that generates a compression metadata error or a data error;
terminating each compressed page that generates a compression metadata error or a data error to repair the volume; and
clearing any inconsistent flag for each compressed page that does not generate a compression metadata error or a data error.

18. The method of claim 16, wherein, when the request is the partial overwrite request, the handling repair of the error while the volume is online comprises:
flagging the compressed page as inconsistent in the translation table entry associated with the compressed page;
determining whether another request to access the compressed page has been received;
based on a determination that the another request is a full page overwrite request:
performing the full page overwrite at a given location other than where the compressed page is stored, wherein the error is a compression metadata error, and updating the translation table entry associated with the compressed page to point to the given location and clearing the inconsistent flag; and based on a determination that the another request is a partial overwrite request or a read request has been received, alerting a user to initiate an online repair.

19. The method of claim 16, wherein the volume is a logical volume.

\* \* \* \* \*